Sept. 10, 1968     J. R. JONES     3,400,592
TIMING CONTROL ARRANGEMENTS FOR ELECTRIC COOKING APPLIANCES
Filed Feb. 10, 1966     2 Sheets-Sheet 1
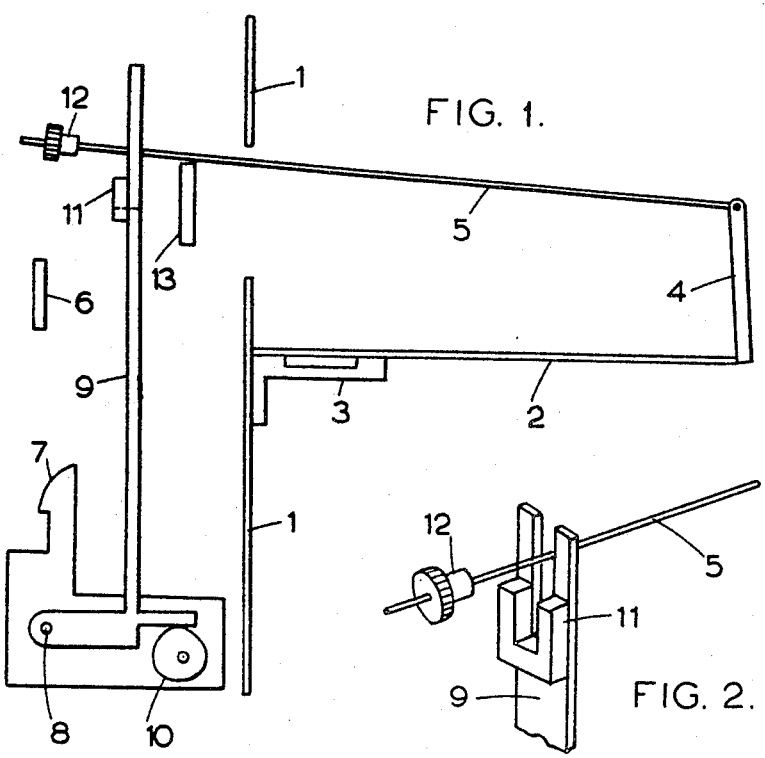
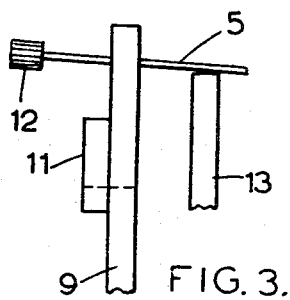
FIG. 3.
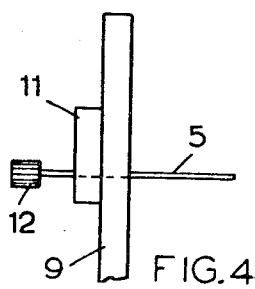
FIG. 4.
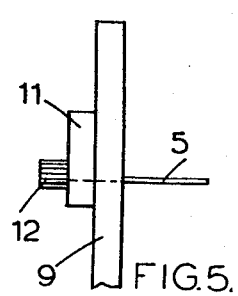
FIG. 5.
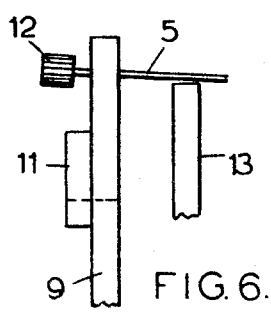
FIG. 6.
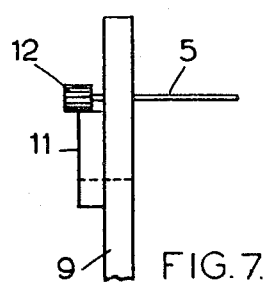
FIG. 7.
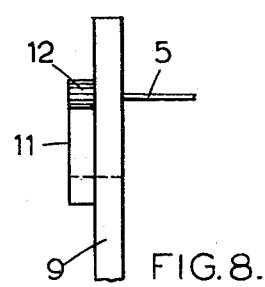
FIG. 8.

United States Patent Office 3,400,592
Patented Sept. 10, 1968

3,400,592
TIMING CONTROL ARRANGEMENTS FOR ELECTRIC COOKING APPLIANCES
John Robert Jones, Sidcup, England, assignor to Morphy-Richards (Cray) Limited, St. Mary, Cray, Kent, England, a company of Great Britain
Filed Feb. 10, 1966, Ser. No. 526,538
Claims priority, application Great Britain, Feb. 13, 1965, 6,322/65
5 Claims. (Cl. 74—3.5)

ABSTRACT OF THE DISCLOSURE

A timing control arrangement for an electrical cooking appliance such as a toaster, which is controlled by a temperature sensitive device located adjacent to the food to be cooked. Members are provided for coupling the control mechanism of said appliance to said device when the arrangement is set, the relative positions of said coupling members being determined by the position of the device at that time, so that the cooking operation is terminated accordingly at different temperatures of said device.

---

Figure 9:
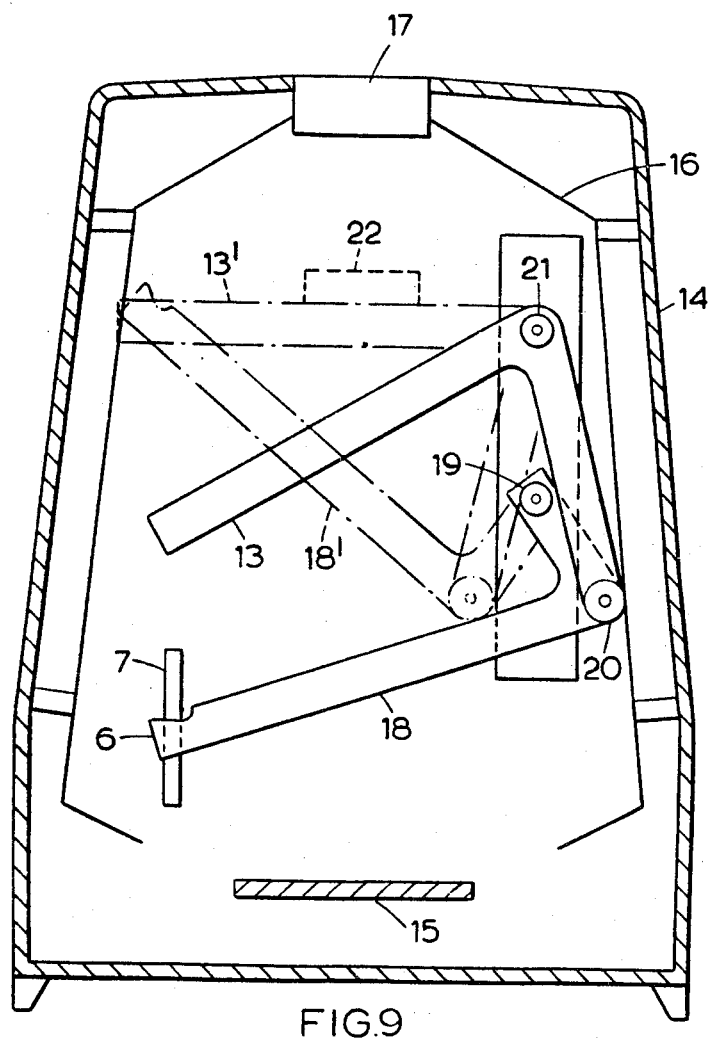

This invention relates to timing control arrangements for electric cooking appliances and especially to such arrangements for electric toasters where it is required to control the cooking time to achieve a desired browning of toast.

In electric toasters in which the cooking period is terminated by the action of a bimetallic element which is subject to radiation emitted from the bread being cooked as well as to the unavoidable influence of the ambient temperature inside the toaster, the difficulty arises that if the element is set to terminate the cooking period with a given degree of browning of the toast when the appliance is used first after a period of non-use, when the toaster is used for a second time immediately afterwards the bimetallic element already retaining some heat from the first operation terminates the second operation too soon and the toast then produced is much paler.

It is an object of the invention to reduce the above mentioned difficulty.

According to the present invention there is provided a timing control arrangement for an electric cooking appliance comprising:

(a) A temperature sensitive device located to be adjacent the food to be cooked, (b) A control mechanism for the appliance which can be manually set to initiate a cooking operation, (c) Coupling members which automatically inter-engage on setting said control mechanism to couple said control mechanism to said temperature sensitive device, so that said device on attaining a particular temperature can unset said control mechanism to terminate cooking, (d) Said control mechanism including means for disengaging said coupling members when the control mechanism is unset, and (e) Formations on said members to cause inter-engagement to take place selectively in one of a plurality of different relative positions, depending on the temperature of said device when the control mechanism is set, the different positions of inter-engagement causing the cooking operation to be terminated at different temperatures of said device.

Preferably said coupling members comprise a link which is moveable longitudinally under control of said temperature sensitive device, and a lever connected to said control mechanism, either said link or lever being stepped in such a way that depending on the temperature of the heat sensitive device when the control mechanism is set, said link and lever inter-engage selectively on different steps.

In order that the invention may be clearly understood and readily carried into effect it will now be described by way of example with reference to the accompanying drawings in which:

FIGURE 1 shows a diagram of the portion of an electric toaster incorporating the invention, FIGURE 2 shows in perspective a detail of the portion shown in FIGURE 1, and FIGURES 3 to 8 show diagrams illustrative of the operation of the invention, FIGURE 9 shows a sectional diagrammatic view of a toaster which incorporates a timing control according to the invention.

Referring to FIGURE 1, the reference numeral 1 designates a chassis member of an electric toaster of the kind in which after the appliance is switched on and after a suitable period for cooking the appliance is automatically switched off. The switch off may be accompanied by ejection of the toast produced. A straight flat strip of bimetal 2 is joined to the chassis member 1 by means of a bracket 3 to which it is spot welded and projects horizontally into the heated region of the toaster. A link rod 4 is clenched or clipped to the other end of the bimetallic strip 2 so as to extend vertically, and at the other end of the link rod is attached by a pivot an actuating coupling member 5 which is approximately horizontal and projects through an opening in the chassis member to the region outside the element region.

The member 6 which is spring loaded so as to be urged upwards is mechanically connected with the switch for the toaster and possibly also with the carriage which carries the bread (neither is illustrated). When the toaster is to be switched on the member 6 is manually lowered until it is caught in the latch hook 7, also spring loaded and pivoted at 8. The latch hook is operated by the release lever 9, that is, when the release arm is moved to the right the latch hook is moved clockwise round the pivot 8 and releases the member 6 which is free to move upwards to a rest position. The relationship between the position of the release lever and the position of the latch hook is adjustable by means of the cam 10, which is rotatable, and the setting of the cam influences the browning of the toast.

The upper end of the release lever 9 has a step portion 11 near the top and on the side away from the chassis member 1, and a slot is cut longitudinally down the centre of the lever from the top to a position in the step. The actuating coupling member 5 lies in the slot. Reference to the perspective drawing of this part of the construction which is shown in FIGURE 2 will make the arrangement clearer. The end of the coupling member 5 away from the link rod 4 is tapped and a nut 12 screwed on to the end of the rod. The diameter of the portion of the nut towards the link rod 4 is greater than the width of the slot. The position of the nut is adjusted by rotation thereof. A member 13 which is mechanically linked with the member 6 raises the coupling member 5 to the position as shown when the toaster is switched off, but at switch on when the member 6 is positioned in the latch hook 7 the member 13 is also lowered and the coupling member 5 is free to fall in the slot.

The manner of operation of the invention will now be described with reference to the series of drawings FIGURES 3 to 8 which show the position of the parts shown in the detail drawing FIGURE 2 at various times during the operation.

Initially, with the toaster switched off, the coupling member 5 is raised by the member 13 to a level such that the nut 12 is above the level of the top of the step 11, as shown in FIGURE 3. When the toaster is switched on, the member 13 is lowered and the coupling member 5 falls in the slot until it rests at the bottom of the slot as shown in FIGURE 4. As the bimetallic element 2 heats it bends downwards and pulls the coupling member 5 to the right via the link rod 4. After the heating has continued for a period the nut 12 contacts the left hand side of the step 11 as shown in FIGURE 5 and further bending of the bimetallic strip causes the nut to pull the release lever 9 to the right and thus to release the member 6. This terminates the cooking period by switching off the toaster, and the rod 5 is raised clear of the step again by the member 13, as shown in FIGURE 6. If now a second cooking operation is commenced immediately, the member 13 is lowered as before and the coupling member 5 falls in the slot. This time, however, the bimetallic strip is still heated from the previous operation and the nut is further to the right than it was initially. When the coupling member falls the nut rests on the top surface of the step 11 in the position as shown in FIGURE 7. After the heating has continued for a period the nut contacts the left hand side of the lever 9 as shown in FIGURE 8 and further heating causes the nut to pull the release lever to the right and terminates the cooking period as before. Subsequent immediate operations will be as illustrated in the FIGURES 6 to 8.

In the absence of the step portion 11 a second cooking operation would be much shorter than an initial one because of the retention of heat by the bimetallic strip. The presence of the step 11 enables second and subsequent operations to be long enough for a similar degree of browning of the toast to be achieved to that obtained at the initial operation.

FIGURE 9 illustrates in cross-section diagrammatically a toaster which incorporates a timing arrangement. The outer casing of the toaster is indicated at 14 and a heating element 15 is located near the base. Polished metal sheets 16 are provided to extend along the length of the toaster so as to reflect heat towards the centre which would otherwise be lost to the walls. A slot 17 in the top allows bread which is to be toasted to be inserted into the apparatus. The end view of latch hook 7 shown in FIGURE 1 and viewed in the plane of that drawing is shown in FIGURE 9 and is located so that it can engage with the end 6 of the arm of an angled lever member 18 pivoted at 19 so as to be capable of rotation about 19. The member 18 is spring loaded and when released by latch hook 7 it moves to the position 18' shown by dashed lines. A side view of the member 13 which is shown in end view in FIGURE 1 is also shown in FIGURE 9. The raised position of said member as indicated in FIGURE 1 is indicated by dashed lines in FIGURE 9 at 13', and the lowered position by solid lines at 13 in FIGURE 9. Said member 13 is an angled lever pivoted at 21 so as to be capable of rotation about 21. The end of member 13 is attached to the angle portion of member 18 by a link at 20 so that the two members 13 and 18 are capable of movement together to the positions 13' and 18'. It will be understood that since the position of the members 13 and 18 at the link 20 move about different centres the link 20 must provide some looseness for example by the link constituting a pin in one member engaging with a slot in the other member. At the pivot 19 the member 18 is attached to a spindle running along the length of the toaster and which rotates with the member 18. Said spindle carries arms on which the bread rests and when the spindle rotates with the member 18 the bread is raised or lowered.

In operation, the members are initially in the positions indicated at 13' and 18' and the arms for the bread are in a raised position. Bread is inserted at the slot 17 and the cooking cycle initiated by depressing the handle indicated at 22 which is coupled to the members so that they are moved to the positions 13 and 18 against a spring. The arms thus lower the bread into the toaster, and further means operated by the spindle at 19 switch on the supply of electricity to the heater element 15. The member 18 is latched in position by the latch hook 7. After a cooking period which is determined as described above with reference to FIGURE 1 the latch hook 7 releases member 18 which returns by the action of spring means to position 18' carrying member 13 back to position 13'. This causes the spindle at 19 to rotate and raise the arms attached thereto whereby the bread is ejected, and furthermore the electricity supply to the heater 15 is switched off.

It will be apparent that the timing arrangement described may be modified in several ways whilst still making use of the present invention. For example, the stepped portion may be on the coupling member instead of on the release lever, and the stepped portion may in either case consist of a plurality of steps in echelon.

The invention is not confined to toasters but may be applied to control arrangements for other electric appliances, such as grills, skillets and waffle irons.

What I claim is:
1. A timing control arrangement for an electric cooking appliance comprising:
   (a) a temperature sensitive device located to be adjacent the food to be cooked,
   (b) a control mechanism for the appliance which can be manually set to initiate a cooking operation,
   (c) coupling members which automatically interengage on setting said control mechanism to couple said control mechanism to said temperature sensitive device, so that said device on attaining a particular temperature can unset said control mechanism to terminate cooking,
   (d) said control mechanism including means for disengaging said coupling members when the control mechanism is unset, and
   (e) formations on said members to cause interengagement to take place selectively in one of a plurality of different relative positions, depending on the temperature of said device when the control mechanism is set, the different positions of interengagement causing the cooking operation to be terminated at different temperatures of said device.

2. A timing control arrangement according to claim 1 in which said coupling members comprise a link which is moveable longitudinally under control of said temperature sensitive device, and a lever connected to said control mechanism, either said link or lever being stepped in such a way that depending on the temperature of the heat sensitive device when the control mechanism is set, said link and lever inter-engage selectively on different steps.

3. A timing control arrangement according to claim 2 in which said lever has a raised portion, said link has an enlarged portion at its end for inter-engagement with said lever on or off said raised portion, said link being arranged to be moved by said disengaging means to move said enlarged portion clear of said lever after each cooking operation.

4. A timing control arrangement according to claim 3 in which said raised portion on said lever comprises a plurality of steps in echelon.

5. A timing control arrangement according to claim 1 incorporated in an electric toaster so that said temperature sensitive device is sensitive to the temperature of the bread being toasted.

References Cited

UNITED STATES PATENTS

| | | | |
|---|---|---|---|
| 2,365,909 | 12/1944 | Sardeson | 74—3.5 |
| 2,585,466 | 2/1952 | Humphery et al. | 74—3.5 |
| 2,611,849 | 9/1952 | Gough | 74—3.5 |
| 2,592,826 | 4/1952 | Scharf | 74—3.5 |

FRED C. MATTERN, Jr., *Primary Examiner.*

W. S. RATLIFF, *Assistant Examiner.*